(12) United States Patent
Miller et al.

(10) Patent No.: US 10,657,118 B2
(45) Date of Patent: May 19, 2020

(54) UPDATE BASIS FOR UPDATING DIGITAL CONTENT IN A DIGITAL MEDIUM ENVIRONMENT

(71) Applicant: Adobe Inc., San Jose, CA (US)

(72) Inventors: Gavin Stuart Peter Miller, Los Altos, CA (US); Kevin Gary Smith, Lehi, UT (US); Kent Andrew Edmonds, San Jose, CA (US); Govind P. Balakrishnan, Foster City, CA (US)

(73) Assignee: Adobe Inc., San Jose, CA (US)

( * ) Notice: Subject to any disclaimer, the term of this patent is extended or adjusted under 35 U.S.C. 154(b) by 175 days.

(21) Appl. No.: 15/726,125

(22) Filed: Oct. 5, 2017

(65) Prior Publication Data

US 2019/0108250 A1    Apr. 11, 2019

(51) Int. Cl.
| | |
|---|---|
| *G06F 15/16* | (2006.01) |
| *G06F 16/23* | (2019.01) |
| *H04W 4/60* | (2018.01) |
| *G06F 16/48* | (2019.01) |
| *G06F 16/958* | (2019.01) |

(Continued)

(52) U.S. Cl.
CPC ........ *G06F 16/2322* (2019.01); *G06F 16/489* (2019.01); *G06F 16/958* (2019.01); *H04L 67/02* (2013.01); *H04L 69/28* (2013.01); *H04W 4/60* (2018.02); *H04L 67/1095* (2013.01)

(58) Field of Classification Search
CPC .. G06F 21/561; G06F 16/2322; G06F 16/489; G06F 16/958; H04W 4/60; H04L 67/02; H04L 67/28; H04L 67/2095
See application file for complete search history.

(56) References Cited

U.S. PATENT DOCUMENTS

| | | |
|---|---|---|
| 6,922,699 B2 | 7/2005 | Schuetze et al. |
| 8,442,683 B2 | 5/2013 | Lee |

(Continued)

FOREIGN PATENT DOCUMENTS

| | | |
|---|---|---|
| WO | WO-2015027223 | 2/2015 |

OTHER PUBLICATIONS

Foley, Joe, "How to Get WordPress Rotating Header Images", Apr. 19, 2013, WPMU DEV, pp. 1-10 (Year: 2013).*

(Continued)

*Primary Examiner* — Jonathan A Bui
(74) *Attorney, Agent, or Firm* — SBMC

(57) ABSTRACT

An update basis for updating digital content in a digital medium environment is described. The digital content is updated by incorporating new digital content components from a service provider system, such as a stock content service, to keep the digital content from seeming stale to client device users. The service provider system controls provision of digital content components according to an update basis described in a component request. In part, component requests ask that the service provider system provide digital content components for incorporation with digital content. Component requests also describe a timing basis with which digital content components are to be provided as updates. By way of example, the timing basis may correspond to a time interval (e.g., daily, weekly, monthly, seasonally, times of day, and so on), receiving user input in relation to the digital content (e.g., a navigation input to a web page), and so forth.

20 Claims, 8 Drawing Sheets

(51) Int. Cl.
  *H04L 29/08* (2006.01)
  *H04L 29/06* (2006.01)

(56) References Cited

U.S. PATENT DOCUMENTS

| | | | |
|---|---|---|---|
| 8,752,112 B2 | 6/2014 | Krasic et al. | |
| 9,117,227 B1 | 8/2015 | Agrawal et al. | |
| 9,134,978 B1 | 9/2015 | Roskind | |
| 9,152,624 B1* | 10/2015 | Krallman | G06F 16/00 |
| 9,367,524 B1 | 6/2016 | Filev et al. | |
| 9,396,483 B2 | 7/2016 | Hamedi | |
| 9,554,093 B2 | 1/2017 | Hua et al. | |
| 9,646,227 B2 | 5/2017 | Suri et al. | |
| 9,736,503 B1 | 8/2017 | Bakshi et al. | |
| 9,811,590 B1* | 11/2017 | Acharya | G06F 16/958 |
| 10,339,173 B2* | 7/2019 | Fukuda Kelley | G06F 16/48 |
| 10,341,199 B2* | 7/2019 | Peri | H04L 41/5045 |
| 10,600,075 B2 | 3/2020 | Fabbri et al. | |
| 2001/0035873 A1 | 11/2001 | Easter | |
| 2002/0107926 A1 | 8/2002 | Lee | |
| 2002/0150295 A1 | 10/2002 | Kwok et al. | |
| 2004/0133081 A1 | 7/2004 | Teller et al. | |
| 2005/0002586 A1 | 1/2005 | Liege et al. | |
| 2006/0048092 A1 | 3/2006 | Kirkley | |
| 2006/0080314 A1 | 4/2006 | Hubert et al. | |
| 2006/0085255 A1 | 4/2006 | Hastings et al. | |
| 2007/0250901 A1 | 10/2007 | McIntire | |
| 2008/0120646 A1 | 5/2008 | Stern et al. | |
| 2008/0215509 A1 | 9/2008 | Charlton | |
| 2008/0249855 A1 | 10/2008 | Collins et al. | |
| 2009/0006467 A1 | 1/2009 | Visscher | |
| 2009/0079871 A1 | 3/2009 | Hua et al. | |
| 2009/0092374 A1 | 4/2009 | Kulas | |
| 2009/0144129 A1 | 6/2009 | Grouf et al. | |
| 2010/0023393 A1* | 1/2010 | Costy | G06Q 30/02 705/14.43 |
| 2010/0118035 A1* | 5/2010 | Yamakami | G06T 13/80 345/473 |
| 2010/0120402 A1 | 5/2010 | Sethi et al. | |
| 2011/0239253 A1* | 9/2011 | West | H04N 21/234363 725/46 |
| 2011/0320441 A1 | 12/2011 | Lee et al. | |
| 2012/0116868 A1 | 5/2012 | Chin et al. | |
| 2012/0272160 A1 | 10/2012 | Spivack et al. | |
| 2013/0159110 A1 | 6/2013 | Rajaram et al. | |
| 2013/0304604 A1* | 11/2013 | Hoffman | G06Q 30/0621 705/26.5 |
| 2014/0040067 A1 | 2/2014 | England et al. | |
| 2014/0046777 A1 | 2/2014 | Markey et al. | |
| 2014/0114746 A1 | 4/2014 | Pani et al. | |
| 2014/0130076 A1 | 5/2014 | Moore et al. | |
| 2014/0156379 A1 | 6/2014 | Pani et al. | |
| 2014/0324604 A1 | 10/2014 | Torres et al. | |
| 2014/0372901 A1 | 12/2014 | Catlin et al. | |
| 2015/0100377 A1 | 4/2015 | Penumaka et al. | |
| 2015/0161648 A1 | 6/2015 | Heath et al. | |
| 2015/0324867 A1* | 11/2015 | Jalili | H04L 67/2847 705/14.73 |
| 2016/0078520 A1 | 3/2016 | Nice et al. | |
| 2016/0086215 A1 | 3/2016 | Wang et al. | |
| 2016/0286244 A1 | 9/2016 | Chang et al. | |
| 2016/0300135 A1 | 10/2016 | Moudy et al. | |
| 2016/0335339 A1 | 11/2016 | Venkataraman et al. | |
| 2017/0061500 A1 | 3/2017 | Borodin | |
| 2017/0078350 A1 | 3/2017 | Gordon | |
| 2017/0099525 A1 | 4/2017 | Ray et al. | |
| 2017/0140283 A1 | 5/2017 | Cheng et al. | |
| 2017/0161773 A1 | 6/2017 | Xu et al. | |
| 2017/0337234 A1 | 11/2017 | Goldman et al. | |
| 2018/0012253 A1 | 1/2018 | Gavlovski et al. | |
| 2018/0040019 A1 | 2/2018 | Gavlovski et al. | |
| 2018/0040029 A1 | 2/2018 | Zeng et al. | |
| 2018/0101611 A1 | 4/2018 | McDevitt et al. | |
| 2018/0109612 A1* | 4/2018 | Zhong | G06F 16/9574 |
| 2018/0189822 A1 | 7/2018 | Kulkarni et al. | |
| 2018/0240152 A1 | 8/2018 | Mookherjee et al. | |
| 2019/0034809 A1 | 1/2019 | Xu et al. | |
| 2019/0080019 A1 | 3/2019 | Young et al. | |
| 2019/0095945 A1 | 3/2019 | Fabbri et al. | |
| 2019/0095949 A1 | 3/2019 | Chien et al. | |
| 2019/0108288 A1 | 4/2019 | Miller et al. | |
| 2019/0114151 A1 | 4/2019 | Jacobs et al. | |
| 2019/0114663 A1 | 4/2019 | Goldman et al. | |
| 2019/0114664 A1 | 4/2019 | Goldman et al. | |
| 2019/0114672 A1 | 4/2019 | Jacobs et al. | |
| 2019/0114680 A1 | 4/2019 | Chien et al. | |
| 2019/0130356 A1 | 5/2019 | Balakrishnan et al. | |
| 2019/0130458 A1 | 5/2019 | Balakrishnan et al. | |
| 2019/0164082 A1 | 5/2019 | Wu | |

OTHER PUBLICATIONS

Forrest,"How Google wants to crowdsource machine learning with smartphones and Federated Learning", Retrieved at: https://www.techrepublic.com/article/how-google-wants-to-crowdsource-machine-learning-with-smartphones-and-federated-learning/, Apr. 7, 2017, 10 pages.

McMahan,"Communication-Efficient Learning of Deep Networks from Decentralized Data", Proceedings of the 20 the International Conference on Artificial Intelligence and Statistics (AISTATS) 2017. JMLR: W&CP vol. 54, Feb. 28, 2017, 11 pages.

"Non-Final Office Action", U.S. Appl. No. 15/785,298, dated Sep. 14, 2018, 17 pages.

"Restriction Requirement", U.S. Appl. No. 15/785,298, dated Jul. 19, 2018, 7 pages.

"Pre-Interview First Office Action", U.S. Appl. No. 15/716,348, dated Jan. 29, 2019, 3 pages.

"First Action Interview Office Action", U.S. Appl. No. 15/716,348, dated Feb. 20, 2019, 3 pages.

"Pre-Interview First Office Action", U.S. Appl. No. 15/726,168, dated Mar. 19, 2019, 7 pages.

"Pre-Interview First Office Action", U.S. Appl. No. 15/785,298, dated Sep. 21, 2018, 4 pages.

"First Action Interview Office Action", U.S. Appl. No. 15/785,298, dated Oct. 1, 2018, 4 pages.

"Final Office Action", U.S. Appl. No. 15/785,298, dated Apr. 17, 2019, 24 pages.

"Final Office Action", U.S. Appl. No. 15/716,348, dated Jul. 23, 2019, 25 pages.

"First Action Interview Office Action", U.S. Appl. No. 15/726,168, dated Jun. 28, 2019, 6 pages.

"First Action Interview Office Action", U.S. Appl. No. 15/783,228, dated Aug. 22, 2019, 8 pages.

"Pre-Interview First Office Action", U.S. Appl. No. 15/782,457, dated Sep. 11, 2019, 4 pages.

"Pre-Interview First Office Action", U.S. Appl. No. 15/783,228, U.S. Appl. No. Jul. 8, 2019, 8 pages.

"Restriction Requirement", U.S. Appl. No. 15/782,517, dated Jul. 11, 2019, 7 pages.

"Final Office Action", U.S. Appl. No. 15/783,228, dated Oct. 24, 2019, 23 pages.

"First Action Interview Office Action", U.S. Appl. No. 15/782,457, dated Oct. 29, 2019, 3 pages.

"Non-Final Office Action", U.S. Appl. No. 15/785,298, dated Dec. 9, 2019, 11 pages.

"Non-Final Office Action", U.S. Appl. No. 15/801,173, dated Oct. 30, 2019, 22 pages.

"Pre-Interview First Office Action", U.S. Appl. No. 15/713,339, dated Aug. 8, 2019, 3 pages.

"Pre-Interview First Office Action", U.S. Appl. No. 15/801,173, dated Dec. 2, 2019, 4 pages.

"Final Office Action", U.S. Appl. No. 15/726,168, dated Dec. 11, 2019, 11 pages.

"Notice of Allowance", U.S. Appl. No. 15/713,339, dated Nov. 25, 2019, 13 pages.

"Notice of Allowance", U.S. Appl. No. 15/782,457, dated Feb. 7, 2020, 14 pages.

(56) References Cited

OTHER PUBLICATIONS

"Non-Final Office Action", U.S. Appl. No. 15/782,517, dated Dec. 12, 2019, 30 pages.
"Global Unique Identifier", Tech Terms, Retrieved at: https://techterms.com/definition/guid, Oct. 13, 2008, 1 page.
"Non-Final Office Action", U.S. Appl. No. 15/716,348, dated Mar. 25, 2020, 26 pages.
"Non-Final Office Action", U.S. Appl. No. 15/801,090, dated Mar. 10, 2020, 26 pages.
"Non-Final Office Action", U.S. Appl. No. 15/801,173, dated Mar. 31, 2020, 26 pages.
"Notice of Allowance", U.S. Appl. No. 15/726,168, dated Mar. 26, 2020, 9 pages.
"Pre-Interview First Office Action", U.S. Appl. No. 15/801,090, dated Mar. 16, 2020, 5 pages.

\* cited by examiner

700

702
Identify a first digital content component from a content repository based on data specifying at least one fixed or variable attribute that provided digital content components are to exhibit

704
Optionally modify the first digital content component based on the data specifying the at least one fixed or variable attribute

706
Deliver the first digital content component for incorporation with the digital content, the first digital content component including at least one modification when modified

708
Identify a second digital content component from the content repository for updating the digital content based on the data specifying the at least one fixed or variable attribute

710
Optionally modify the second digital content component based on the data specifying the at least one fixed or variable attribute

712
Deliver the second digital content component for incorporation with the digital content, the second digital content component including at least one modification when modified

*Fig. 7*

UPDATE BASIS FOR UPDATING DIGITAL CONTENT IN A DIGITAL MEDIUM ENVIRONMENT

BACKGROUND

Service provider systems continue to make advances in computing technologies to enable delivery of digital content to client devices in an ever-increasing number of settings. This includes delivery to a variety of devices with which users interact. Examples of different client devices include desktop computers, tablet devices, mobile telephones, digital watches, televisions, home appliances, voice-interaction devices, and so on. This also includes delivery of digital content by a variety of service provider systems. Examples of service provider systems include systems associated with businesses attempting to sell products and/or services, social networking service systems, informational service systems, user contact service systems, and so forth. Due to this, these client devices may be exposed to a near-continuous stream of digital content, which may consume a significant amount of network resources and also hardware resources of these client devices to consume this content.

This continuous delivery may also affect user interaction with the client devices. For instance, continued user exposure to digital content from various sources may reduce an effectiveness of this digital content on users of the devices, e.g., to cause conversion of a product or service. This is because the users may become "numb" to at least some if not all of the digital content due to the continuous exposure. This "numbing" can cause users to ignore much of the content rather than be engaged by it in a way that causes the users to take a desired action, such as to cause conversion by digital marketing content from a digital marketing system. As a result, the digital content fails for its intended purpose.

SUMMARY

To overcome these problems, an update basis for updating digital content is leveraged in a digital medium environment. The digital content is updated by incorporating new digital content components from a service provider system, such as a stock content service, to keep the digital content from seeming stale to client device users. The service provider system controls provision of digital content components based on fixed and variable attributes that have been specified for these digital content components. Initially, the service provider system receives a component request, requesting that the service provider system provide the digital content components for incorporation with the digital content. The component request also describes a timing basis with which digital content components are to be provided as updates for the digital content. By way of example, the timing basis may correspond to a time interval (e.g., daily, weekly, monthly, seasonally, times of day, and so on), receiving user input in relation to the digital content (e.g., a navigation input to a web page), and so forth. In any case, a content repository service system can be configured to provide digital content components for incorporation with digital content according to the timing basis.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

FIG. 7 depicts a procedure in an example implementation in which different digital content components are delivered for incorporation with digital content.

DETAILED DESCRIPTION

Overview

Figure 1:
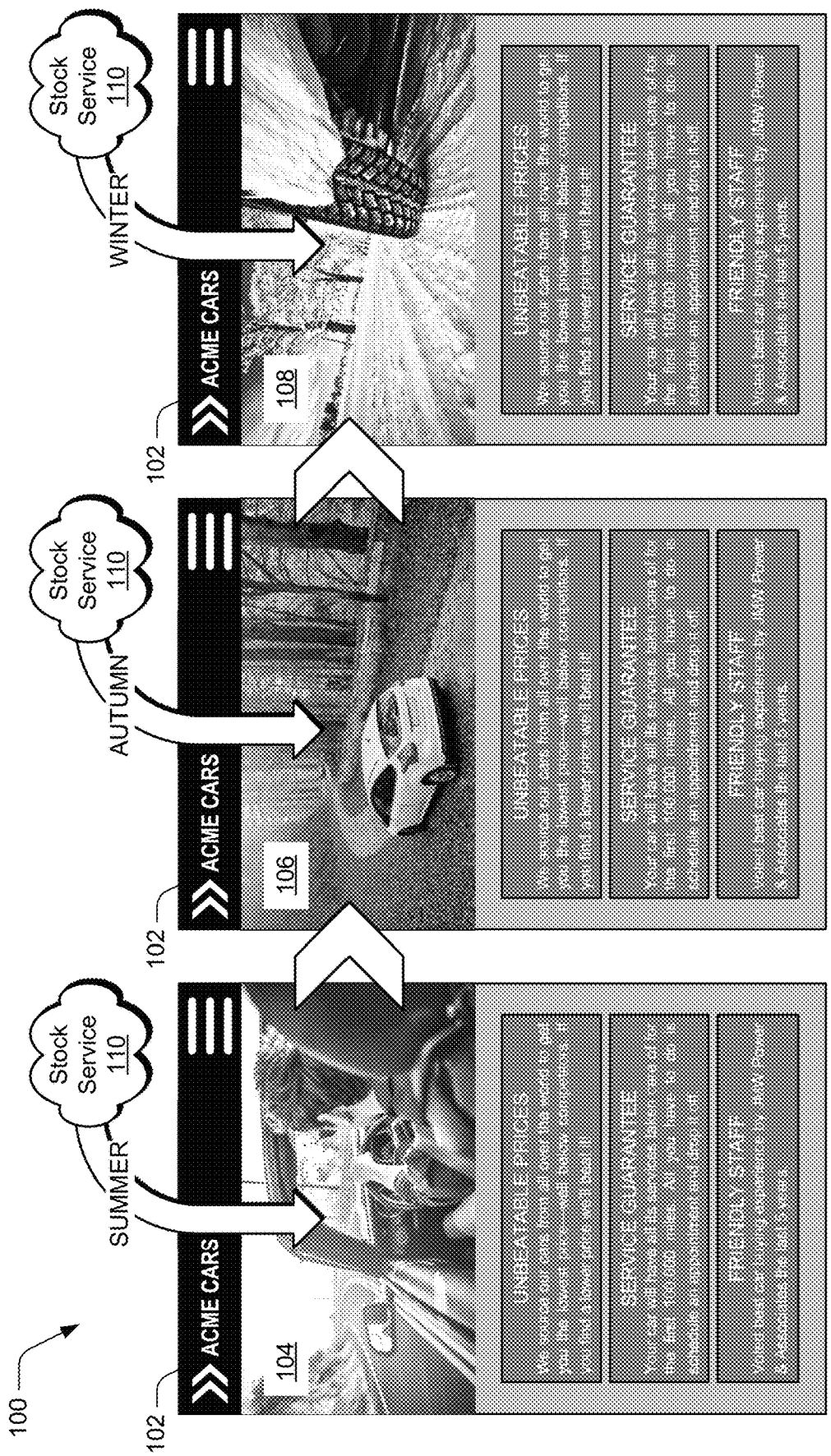
FIG. 1 is an illustration of an example using an update basis for updating digital content in a digital medium environment.

Service provider systems continue to make advances in computing technologies to enable delivery of digital content to client devices in an ever-increasing number of scenarios. Consequently, these client devices may be exposed to a near-continuous stream of digital content. This continuous delivery may consume network resources, consume hardware resources of the client devices to consume this content, and affect user interaction with the client devices. In particular, continued user exposure to digital content from various sources may cause users to become "numb" to at least some if not all of the content. As a result, the effectiveness of the digital content, e.g., to cause conversion of a product or service, is reduced. Moreover, the digital content thus fails for its intended purpose.

To overcome these problems, an update basis for updating digital content is leveraged in a digital medium environment. In one or more implementations, different digital content components are provided on an ongoing basis to update digital content. A web page is one example of digital content that can be updated by incorporating digital content components. A digital image is an example of a digital content component that can be provided to update the web page. Further, a stock content service system is an example of an entity that provides digital content components according to the described techniques. In this context, incorporation of up-to-date images into a web page on an ongoing basis (e.g., according to a subscription) can be effective to keep the web page from seeming stale to users.

Consider an example in which a web page is populated with digital images just before being launched and in which one of those digital images depicts a car having a model year that corresponds to the web-page launch. If this digital image is not replaced for several years, the web page will seem stale to users as the car depicted in the one digital image becomes less and less current. Using the techniques described herein, however, digital images may be provided each year that depict a current-year car model. The provided digital images are incorporated into the example web page, and the example web page thus seems up-to-date to users, e.g., because the image served as part of the web page depicts a current-year car model.

Content attributes are leveraged to control provision of the digital content components. In particular, a request for components describes the attributes that are to be fixed and the attributes that are allowed to vary for the different digital content components. Broadly speaking, a "fixed" content attribute refers to an attribute that is to be included in each digital content component provided. With reference to the above-discussed web-page example, a request is made to a stock service system for digital content components. This request asks for images that depict a car for incorporation into the web page. The depiction of a car therefore corresponds to a fixed attribute of the digital images being requested. In contrast, a "variable" content attribute refers to an attribute that is allowed to vary from one provided digital content component to another. Continuing with the above-discussed web page example, assume that the example request does not specify other attributes as fixed. Accordingly, other attributes of the digital images provided are allowed to vary. Such attributes include, but are not limited to, a location of the depicted car, a color of the depicted car, characteristics of a scene including the depicted car, and so on. As described below, a variety of attributes may be specified as fixed or variable to control the provision of digital content components by content repository service systems.

In general, specification of the fixed and variable attributes is used to identify digital content components from a content repository, such as a repository of stock content components maintained by a stock content service system. For instance, the stock content service system identifies content components having attributes that match fixed attributes of a request and differ as permitted by the variable attributes of the request. The specified fixed and variable attributes are further used to modify digital content components identified from a repository, such as when an identified component matches some specified attributes but not each of them. Consider an example in which a stock digital image depicts an object that is specified by a request. Assume in this example that, except for a color of the specified object, other attributes of the example stock digital image match the fixed attributes of the request. Assume also that the request indicates a particular color of the specified object. Given this, the described techniques are utilized to modify the example stock digital image so that the specified object has the particular color indicated by the request, e.g., by generating a content layer that changes the color of the object when applied to the stock digital image.

By leveraging the described techniques, service provider systems deliver digital content to client device users that the client device users perceive as up-to-date. This results from the service provider systems transforming the digital content by incorporating up-to-date digital content components provided by a content provider system, e.g., a stock content service. Doing so is effective to keep digital content from being perceived as stale by client device users. In contrast, conventionally configured digital content often seems stale because updating it is subject to a manual process, which users may be reluctant to undertake frequently and which involves the users selecting content components for incorporation. Leveraging the described techniques also supports a variety of other advantages. For example, consider the following. In accordance with the described techniques, an entity (e.g., a business) may take out a subscription with a stock content service to receive digital content components. In general, a request submitted in connection with the subscription describes the types of digital content components the entity desires. The stock content service may not maintain digital content components that are capable of fulfilling the subscription for its lifetime, however. In these scenarios, the described techniques enable the stock content service to easily commission a content creator to create more digital content components for fulfilling the subscription. Based on the specified fixed and variable attributes, for instance, a description of desired types of content components can be generated.

In this context, consider a scenario in which an entity requests digital images that depict a current version of a particular mobile phone in a current season and in which the digital images are to be included as part of a web page. Such a request may be submitted to a stock content service system in connection with a subscription to receive digital images. At a time of the request, however, the stock content service does not have digital images that can be used to fulfill such a request in perpetuity—assuming that a new, not-yet-photographed version of the mobile phone will be released at some point in the future. Based on the request, the stock content service has knowledge that digital images depicting the above-described mobile phone will be needed at least for the life of the subscription. The stock content service can leverage this knowledge to commission a photographer to capture such images and provide them to the stock content service. The stock content service can then use the images provided by the commissioned photographer to fulfill the subscription.

Term Descriptions

In the following discussion, "digital content" is generally described as incorporating digital content components that are provided by a content repository service system based on specified attributes. An example of digital content capable of incorporating digital content components is a web page. A "digital content component" may refer to any of a variety of types of digital content capable of being incorporated into other digital content. Examples of digital content components include images, videos, audio clips, sounds, graphics, and so forth. Digital content may incorporate provided digital content components in one or more component placeholders.

As used herein, "updating digital content" is considered "updating" insofar as it incorporates digital content components provided according to the described techniques. For instance, the digital content components may be provided based on a subscription with a content repository service system, such as a stock content service. Alternately or in addition, the digital content components may be suggested as a result of the content repository service system determining that a currently incorporated digital content component is out-of-date. The digital content components may be provided in still other ways to form the "updating" digital content.

As used herein, a "subscription" for digital content components refers to an agreement to provide digital content components in exchange for compensation, e.g., money, signing up for a user account, and so on. A subscription may have a variety of bases without departing from the spirit or scope of the techniques described herein, such as daily, monthly, weekly, seasonally, yearly, and so on. A basis for a subscription may also correspond with the occurrence of other types of events, such as releases of a product, a request from a client-device user to obtain digital content (e.g., a web page), and so forth.

As used herein, the term "non-destructive" refers to a characteristic of digital content modifications that enables them to be undone. In other words, the term refers to digital content modifications, which are applied to an original version of a content component and which may be turned off or removed to revert to the original version. When the modifications remain applied, the content component is modified from the original version. When the modifications are turned off or otherwise removed, the original version of the content component is observable.

Application of digital content "layers" is one example technique of applying non-destructive modifications to digital content components. Examples of layers include, but are not limited to, binary masks, blurring masks, filtering layers, and so on.

In the following discussion, an example using the techniques described herein and example environment that may employ such techniques are first described. Example implementation details and procedures are then described which may be performed in the example environment as well as other environments. Consequently, performance of the example procedures is not limited to the example environment and the example environment is not limited to performance of the example procedures.

Example Use and Environment

FIG. 1 is an illustration of an example 100 in which attribute control is used in connection with updating digital content in a digital medium environment. The illustrated example 200 includes digital content 102, which is depicted as a web page (e.g., a web page for 'ACME CARS'), though other types of digital content may be transformed by incorporating up-to-date digital content components without departing from the techniques described herein. For example, digital content components may also be used to transform an interface of a network-enabled application (e.g., mobile or desktop), content delivered by such applications, a graphical user interface (GUI) associated with a home appliance, and so forth. By leveraging the techniques described herein, the digital content 102 may be transformed by incorporating new digital content components in a manner that keeps the digital content 102 from becoming 'stale'. Indeed, the techniques can be leveraged to deliver up-to-date and customized digital content to end users.

In the illustrated example 100, three different versions of the digital content 102 are depicted. A first version of the digital content 102 includes image 104, a second version of the digital content 102 includes image 106, and a third version of the digital content 102 includes image 108. The example images 104, 106, 108 are each different and, in this case, depict a progression of seasons, e.g., summer, autumn, and winter. The illustrated example 100 also includes stock service 110, which represents functionality to deliver digital content components having controlled attributes. By "controlled" it is meant that attributes of the digital content components provided for the digital content 102 can be "fixed" or "variable" as specified. Fixed attributes are attributes of the provided components that generally are to stay the same for each digital content component provided.

In the illustrated example 100, for instance, a user (e.g., a marketer associated with ACME CARS) may have specified that each new image is to include an automobile (or a portion of an automobile). In other words, the presence of an automobile or a portion thereof is a fixed attribute of the images. Variable attributes are attributes of the provided components that are allowed to vary. With reference to the illustrated example 100, the automobile's location in the image, color, depicted view (e.g., from substantially within, further away to depict an entirety of the automobile, substantially underneath depicting a portion of the automobile), and so on may be allowed to vary, and are thus variable attributes. Similarly, the seasonal scene depicted is allowed to vary, and thus also corresponds to a variable attribute of the provided digital content components. These fixed and variable attributes enable the stock service 110 not only to select up-to-date content components for refreshing the digital content 102 but also to ensure that the selected components maintain a desired "look and feel" associated with the digital content 102. Accordingly, the described techniques enable users to specify content attributes that are to be fixed and attributes that are allowed to vary. The described techniques can also involve determining to present certain attributes to a user for making such selections, e.g., the stock service 110 can determine to present an option that allows the seasonality of provided components to be changed. Further, the described techniques can involve suggesting to a user attributes to specify and/or attributes the user should allow to remain variable—though the user can choose not to honor the suggestions. These suggestions may be presented via a user interface that enables the users to specify content attributes as fixed or variable.

Using the described techniques, a service provider (e.g., ACME CARS) can take out a subscription with the stock service 110 to receive up-to-date digital content components, e.g., images on some recurring basis. The stock service 110 delivers these digital content components according to the subscription. For instance, the illustrated example 100 represents a scenario in which the stock service delivers a new digital image seasonally. Given this, the delivered components can be incorporated to transform the digital content 102 seasonally. Although a season-based subscription is described in relation to the example 100, digital content may be updated at different intervals of time or based on models other than subscriptions as described in more detail below. Further, the stock service 110 can deliver various different types of digital content components in accordance with the described techniques, such as images, videos, graphics, songs, sounds, voices, and so forth. In this context, consider the digital medium environment of FIG. 2.

Figure 2:
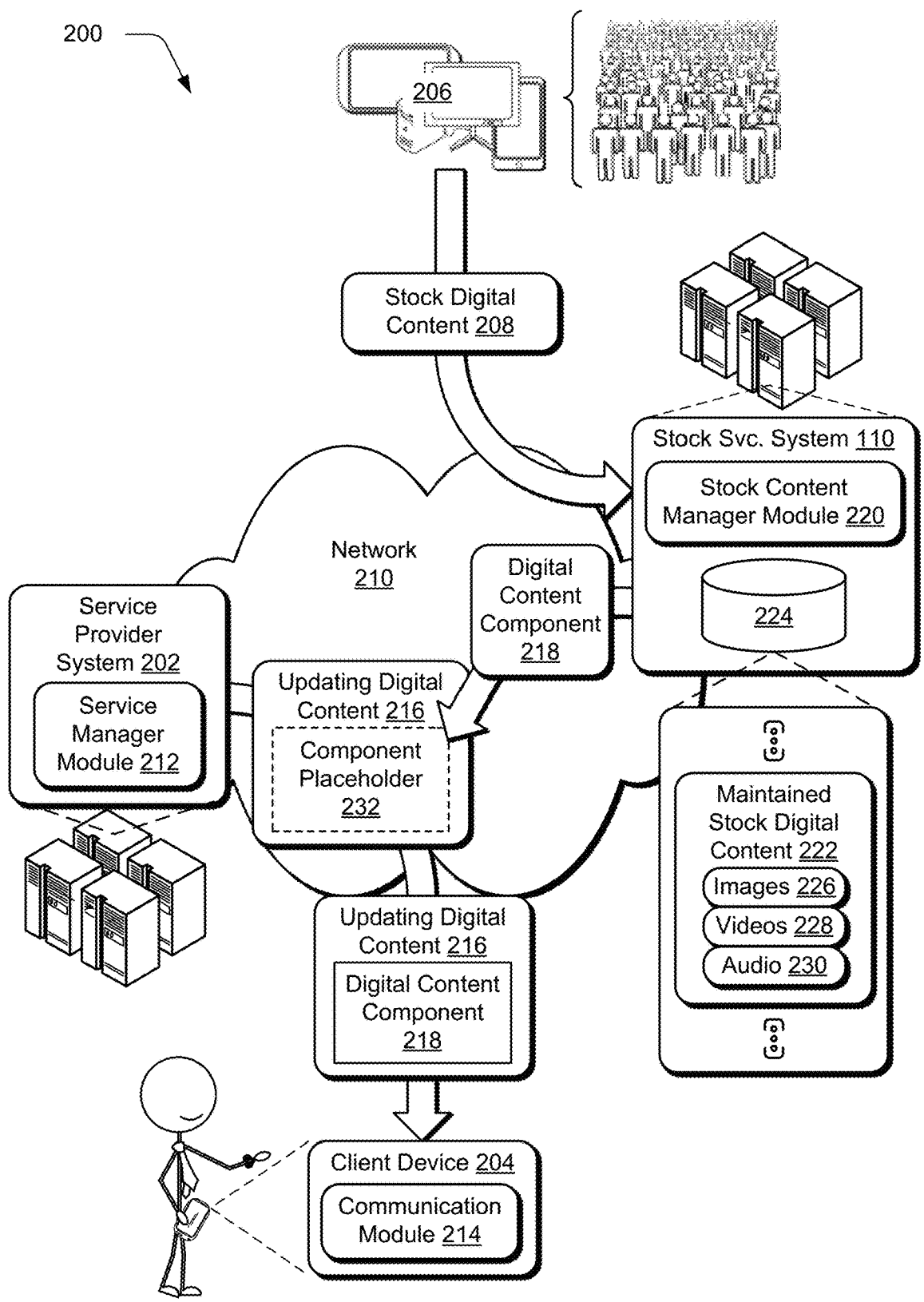
FIG. 2 is an illustration of an environment in an example implementation that is operable to employ techniques described herein.

FIG. 2 is an illustration of a digital medium environment 200 in an example implementation that is operable to employ an update basis for updating digital content described herein. The illustrated environment 200 includes the stock service system 110 from FIG. 1. The illustrated environment also includes service provider system 202, client device 204, and source 206 of stock digital content 208 (e.g., images, videos, songs, sounds, voices, and a variety of other content created and/or modified by users associated with the sources 206) that are communicatively coupled, one to another, via a network 210.

Computing devices that are usable to implement the stock service system 110, service provider system 202, client device 204, and source 206 may be configured in a variety of ways. A computing device, for instance, may be configured as a desktop computer, a laptop computer, a mobile device (e.g., assuming a handheld configuration such as a tablet or mobile phone), and so forth. Thus, the computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as further described in relation to FIG. 8.

The service provider system 202 is illustrated as including a service manager module 212 that is representative of functionality to provide services accessible via the network 210. These services are usable to make products or services available to consumers. The service manager module 212, for instance, may expose a website or other functionality that is accessible via the network 210 by a communication module 214 of the client device 204. The communication module 214 may be configured in a variety of ways, e.g., it may be configured as a browser-based application, a network-enabled application, and so on that obtains data from the service provider system 202 via the network 210. This data can be employed by the communication module 214 to enable a user of the client device 204 to perform a variety of actions in connection with the service provider system 202, such as to view, listen to, or otherwise consume information about products or services of the service provider system 202.

Updating digital content 216 is an example of data that is capable of providing such information about the service provider system 202 and in relation to which a user of the client device 204 can perform a variety of actions. In general, the updating digital content 216 represents any of a variety of types of digital content transformed by incorporation of digital content components 218 in accordance with the described techniques. As discussed above and below, attributes of the digital content component 218 are controlled so that when provided, the digital content component 218 is suitable for an intended purpose (e.g., to depict a particular object in a scene) and appears to users to be up-to-date. Broadly speaking, the digital content component 218 is not stale insofar as it does not correspond to a content component initially chosen for inclusion in a multi-component layout, which is not changed. Accordingly, the updating digital content 216 can enable a user of the client device 204 to perform a variety of actions in connection with the service provider system 202 when presented, e.g., via display, output via at least one speaker, and so forth.

In order to transform the updating digital content 216 by incorporating the digital content component 218, the service provider system 202 may employ the stock service system 110. Although functionality of the stock service system 110 is illustrated as separate from the service provider system 202, this functionality may also be incorporated as part of the service provider system 202, further divided among other entities, and so forth. The stock service system 110 includes a stock content manager module 220 that is implemented at least partially in hardware of a computing device to provide stock digital content components to update updating digital content 216. The stock digital content components provided can be identified from maintained stock digital content 222, which is illustrated as stored in storage 224. The stock service system 110 also represents functionality to modify attributes of the maintained stock digital content 222 and provide modified stock content components for updating digital content as discussed in more detail below.

The maintained stock digital content 222 may assume a variety of forms, such as images 226, videos 228, audio 230, and so forth. Content components of the maintained stock digital content 222, for instance, may be selected by the stock content manager module 220 and provided to fill component placeholder 232 of the updating digital content 216. After the digital content component 218 is provided by the stock content manager module 220 and incorporated via the component placeholder 232, the updating digital content 216 can be presented to a user via the client device 204. It should be appreciated that the digital content component 218 may be incorporated into the updating digital content 216 using functionality of any of the service provider system 202, the client device 204, or the stock service system 110.

By way of example, the service manager module 212 may communicate the updating digital content 216 over the network 210 to the stock service system 110 based on a request from the client device 204 for the updating digital content 216. In this example, the stock content manager module 220 may identify a content component from the maintained stock digital content 222 to fill the component placeholder 232. As discussed in more detail below, the components identified to fill the component placeholder 232 have attributes that are controlled based, at least in part, on a request for the components (not shown in FIG. 1). In this example, the components identified by the stock content manager module 220 correspond to the digital content component 218—though the stock content manager module 220 may further modify the identified components in one or more implementations.

In the continuing example, the stock content manager module 220 may transform the received updating digital content 216 by incorporating the digital content component 218 according to the component placeholder 232. The updating digital content 216 having the digital content component 218 may then be communicated to the client device 204. Additionally or alternately, the client device 204 may receive the updating digital content 216 without the digital content component 218 from the service provider system 202 and receive the digital content component 218 from the stock service system 110. In such scenarios, the client device 204 transforms the received updating digital content 216 by incorporating the digital content component 218 according to the component placeholder 232. Further still, the service provider system 202 may receive the digital content component 218 from the stock service system 110 and use the service manager module 212 to perform the above-described transformation. The service manager module 212 may then communicate the updating digital content 216 with the digital content component 218 to the client device 204.

In the context of the described environment 200, consider again the sources 206 of stock digital content 208. These sources 206 may be associated with users that create the stock digital content 208. In the case of a digital image, a user may capture an image of a scene using a camera, upload the captured digital image to a computing device (e.g., one of the sources 206), and/or process the captured digital image using a photo editing application (e.g., to crop the image, apply a filter to at least a portion of the image, blur at least a portion of the image, and so on). In any case, the user may eventually select to communicate the digital image as the stock digital content 208 to the stock service system 110. In a similar manner, videos, songs, sounds, and other digital content components may be provided to the stock service system 110 for use as stock content. In one or more implementations, the sources 206 may correspond to users of a social networking service, such as a social networking service associated with content creation (e.g., Adobe® Behance).

Having considered an example environment, consider now a discussion of some example details of the techniques for an update basis for updating digital content in a digital medium environment in accordance with one or more implementations.

Update Basis for Updating Digital Content

Figure 3:
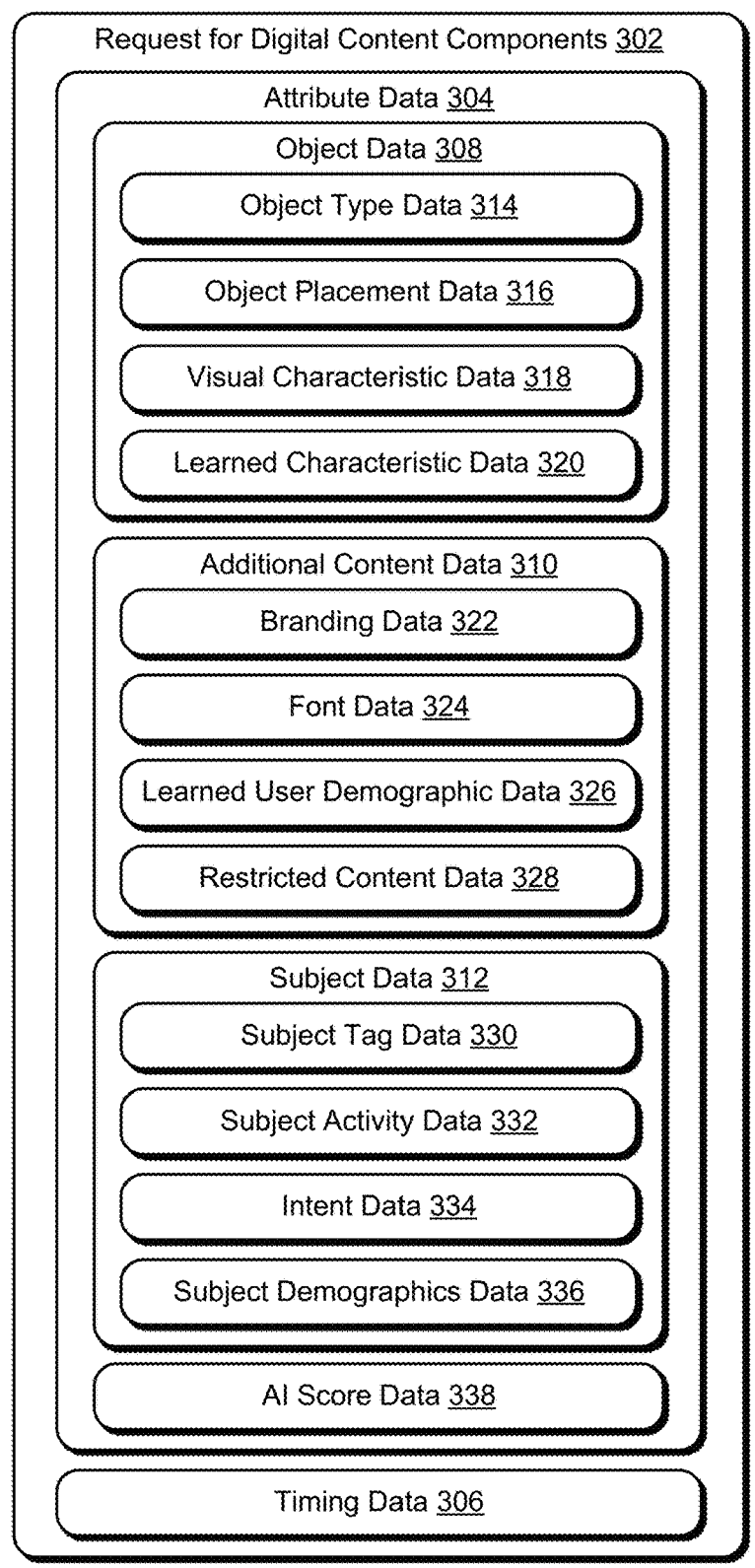
FIG. 3 depicts an example request that includes data for controlling attributes of provided digital content components in connection with updating digital content.

FIG. 3 depicts an example request 300 that includes data for controlling attributes in connection with updating digital content. The illustrated example 300 includes request for digital content components 302 ("request 302"). The request 302 may be communicated by an entity (e.g., the service provider system 202) to the stock service system 110. Broadly speaking, the request 302 represents data used to request digital content components for incorporation into digital content that is provided to end users by the entity. Further, the data of the request 302 may specify criteria for attributes of the provided components based on user selections and/or machine learning.

Consider a scenario in which an entity (e.g., the service provider system 202) is associated with a website, which includes web pages that can be provided to end users, e.g., presented via client devices. In this scenario, the entity may leverage the functionality of the stock content manager module 220 to continually provide images for incorporation into the web pages to keep the web pages from becoming stale. Accordingly, the request 302 may be effective to request suitable images for one or more component placeholders 232 of those web pages.

The request 302 may be configured with a variety of data to control the digital content components identified by the stock service system 110. In particular, this included data is effective to control the provided-component attributes, which may be fixed or variable depending on selections made by a user or made automatically using machine learning. In the illustrated example, the request 302 includes attribute data 304 and timing data 306. In general, the attribute data 304 represents data describing attributes of the digital content components that are to be provided by the stock service system 110.

In contrast, the timing data 306 indicates aspects related to when the digital content components are to be provided by the stock service system 110, such as according to a subscription (e.g., daily, monthly, seasonally, per time of day, on a per user basis, on a per user visit basis, with release of a new version of a product, and so on). The timing data 306 may also indicate that mere suggestions for up-to-date digital content components are to be provided to users, e.g., via email. These suggestions may be user selectable to obtain the suggested components on a pay-per-selection basis. Broadly speaking, the timing data 306 may be based on user selections made when signing up for service with the stock service system 110.

When signing up for service, a user (e.g., a marketer or website owner) may be presented subscription options, such as to select a particular frequency for receiving a different digital content component (e.g., time interval or per user visit), select to receive stock content components as identified from the maintained stock digital content 222 but not modified, select to receive stock content components that are identified and may also be modified depending on the attribute data 304, select to receive one or multiple digital content components, and so forth. Accordingly, the attribute data 304 and the timing data 306 describe a basis by which the stock service system 110 is to provide updates, e.g., different digital content components.

It should be appreciated that the timing data 306 may dictate when the digital content components or suggestions for the digital content components are provided in different ways without departing from the spirit or scope of the techniques described herein. As noted above, for instance, the stock content manager module 220 may provide the digital content components based on a time interval lapsing or per user visit as defined by a subscription and described, in part, by the timing data 306. The basis with which the stock content manager module 220 provides the digital content components may also be consumption based. In a consumption-based updating scenario, a particular digital content component may not be considered stale where a client device user requests the updating digital content 216 and where the updating digital content 216 with the particular digital content component has not been presented to this client device user—though the updating digital content 216 with the particular digital content component may have been presented to other client device users. Given this, the stock content manager module 220 may provide the particular digital content component—as it is not considered stale in connection with the example client device user—for incorporation with the updating digital content 216.

In a scenario where the client device user has been exposed to the updating digital content 216 having the particular digital content component (or exposed to it several times), however, the particular digital content component may be considered stale. Accordingly, the stock content manager module 220 may not provide the particular content component to the client device user that has been exposed to this component. Instead, the stock content manager module 220 may provide a different digital content component for incorporation with the updating digital content 216.

Alternately or in addition, the timing data 306 is based on changes of determined trends. In one or more implementations, the timing data 306 specifies a trend. When a system (e.g., the stock content manager module 220) determines a change in this trend, the change triggers delivery of different digital content components. By way of example, the use of high-dynamic-range (HDR) images may be a trend determined by the stock content manager module 220—a trend for using a type of digital content component. Based on this, the stock content manager module 220 may have a bias (due to attribute weights) towards identifying and providing HDR images as the digital content component 218 during the trend. If the trend changes, however (indicating that the use of HDR images is no longer a trend), the stock content manager module 220 can discontinue providing HDR image as the digital content component 218 (or may provide fewer of them in accordance with a decrease in the trend).

To implement content updating based on trends, the stock service system 110 may be configured to or have access to functionality to determine such trends. For instance, the stock content manager module 220 may be configured to determine these trends. In this scenario, the stock content manager module 220 may be configured to survey various digital media (e.g., a collection of web sites, digital content provided by the sources 206 to a social networking service associated with content creation, hosting services, etc.) to determine characteristics of the content surfaced by the various digital media. Based on the characteristics observed in the surveyed content, the stock content manager module 220 can leverage one or more algorithms to determine trends in the content. These trends may include various characteristics, such as types of media (e.g., HDR images versus images without the dynamic range of luminosity possible using HDR), common included subject matter (e.g., interactions with mobile devices), post-processing characteristics (e.g., auto-tuned audio, use of sepia-colored image filters, and so on), and so forth. These determined trends may be useable not only for a timing basis—such that a change in trend triggers a change in components provided, but may also serve as an attribute of the digital content components provided. If HDR is a trend in digital imaging, for instance, the attribute data 304 can be used to specify that the trending type of digital images (i.e., HDR images) are to be provided.

Returning now to a further discussion of the attribute data 304 in accordance with one or more implementations. For the purpose of clarity, the attribute data 304 is illustrated and discussed in the context of visual content components, such as images and videos. Certainly, the attribute data 304 may be leveraged to control attributes of other types of digital content components (e.g., songs, sounds, voices, haptic feedback, and so forth) that can be provided to fill the component placeholder 232 of the updating digital content 216. In such cases, the attribute data 304 may be configured differently than illustrated and discussed. Indeed, the attribute data 304 for requesting images and/or videos may also be configured differently than illustrated and discussed without departing from the spirit or scope of the described techniques.

To convey at least some attributes the attribute data 304 is capable of controlling, the illustrated example includes object data 308, additional content data 310, and subject data 312. The object data 308 is configured to indicate objects and attributes of the objects that are to be included in the digital content components provided by the stock service system 110. In contrast, the subject data 312 is configured to describe and thus control attributes of the digital content components at a level of granularity that is higher than the object data 308, such that the object data 308 may indicate an object associated with a subject described by the subject data 312. By way of example, when the subject data 312 includes a tag that indicates a subject of the digital content components is to correspond to a 'beach scene,' the object data 308 may be used to describe an object or objects associated with beach scenes, e.g., beach balls. In one or more instances, the request for digital content components 302 may include the subject data 312, but not the object data 308. This may occur in scenarios where it is not desirable to specify the particular objects to be included in the digital content components, but where it is desirable to specify a broader subject or subjects for the digital content components. Broadly speaking, the subject data 312 specifies a subject that is to be conveyed (e.g., depicted in images, audibly conveyed in audio, and so on), in the digital content components that are to be provided.

In any case, the example object data 308 is illustrated with object type data 314, object placement data 316, visual characteristic data 318, and learned characteristic data 320. This data may be representative of selections made and criteria otherwise specified by a user. For instance, a user may enter a text query for an object that is to be included in the provided components (e.g., 'automobile') via a user interface of the stock service system 110. In this scenario, a value for the object type data 314 may be set to indicate that digital content components having an automobile are to be provided.

Regardless of the type of user input leveraged to set values for the attribute data 304, the object type data 314 generally indicates one or more specified objects that are to be included in the provided digital content components. The object type data 314 can be configured to specify not only objects that are to be included in a foreground of the provided components but also a background of the components. Different types of objects that may be described by the object type data 314 include people, animals, other natural objects (e.g., plants, trees, vegetation), landscapes (e.g., beach, forest, mountains, desert, Niagara Falls, the Grand Canyon), devices (e.g., mobile phones, tablet devices, laptop computers, desktop computers, televisions, video game consoles, voice-interaction devices, computing watches, headphones, drones, speakers, cameras), other manufactured products (e.g., automobiles, appliances, textiles), buildings (e.g., houses, multi-family dwellings, office buildings, stadiums), settings (e.g., 'workers laughing in an office,' 'people working out in a gym,' 'monkeys playing at the zoo'), monuments (e.g., the Statue of Liberty, the Eiffel Tower, the Great Wall), and so forth.

The object type data 314 can also be used to describe other attributes of the digital content components such as empty space. By way of example, the described techniques allow a user to request digital images having "empty space" in a described location, such as the upper 80% of the image. As used herein, "empty space" refers to a portion of a digital content component that is suitable for overlaying with additional content such as text or graphics. In some cases, empty space may not correspond to the absence of content. Rather, the empty space may correspond to a background portion (e.g., of an image) that has been blurred so that it is suitable for overlaying additional content. In the context of specifying a location of objects described by the object type data 314, consider the object placement data 316.

Broadly speaking, the object placement data 316 describes locations of objects specified by the object type data 314. In particular, there may be a one-to-one correspondence between the object placement data 316 and the object type data 314 such that each object described by the object type data 314 is associated with respective object placement data 316. The object placement data 316 may be used to describe a placement of an object and a size of the object, e.g., relative to an entirety of a digital content component. For instance, the object placement data 316 can used to describe that empty space is to be located in an upper 80% of a digital content component. As another example, the object placement data 316 can be used indicate that an object described by the object type data 314 is to be vertically and/or horizontally centered. Indeed, the object placement data 316 can be used to specify a variety of positions and sizes for objects without departing from the spirit or scope of the techniques described herein. Although not shown, the attribute data 304 may also include data for describing a size of the digital content or other attributes that do not relate to the substance of the digital content, such as video frame rate, resolution, audio fidelity, format, and so on. For instance, the size data may describe a desired height and width of an image, e.g., in terms of pixels, inches, metric units, and so forth.

The example attribute data 304 also includes the visual characteristic data 318. The visual characteristic data 318 describes visual characteristics of the digital content components that are to be provided. By way of example, the visual characteristic data 318 can specify general characteristics for the components, such as moods (e.g., happy, scary, exciting, sad), styles (e.g., watercolor, oil, photograph, comic book, vector graphic), and so on. The visual characteristic data 318 can also specify characteristics for particular objects described by the object type data 314. Consider an example in which the object type data 314 describes that the digital content components to be provided are to include a mobile phone. The visual characteristic data 318 can be leveraged to specify a color (or some other visual characteristic) for the phone.

In one or more implementations, at least some of the attribute data 304 may be based on a user to which the updating digital content 216 is delivered. In such scenarios, user profile data may be collected and analyzed to determine values for the attribute data 304. For instance, it may be determined that a user likes a particular color, e.g. black. Using this learned information, the visual characteristic data 318 can be set to indicate that the provided digital content components are to include objects of the particular color, e.g., black objects. When this particular user is served a web page from a mobile phone provider, for instance, the served web page is configured to include black mobile phones. When a different user that likes the color pink is served the web page, however, the served web page is configured to include pink mobile phones.

These variations in the visual characteristics of digital content can be implemented by selection and/or modification. With regard to selection, the stock content manager module 220 may simply select images having the desired visual characteristics, e.g., images with black mobile phones for the first example user and images with pink mobile phones for the second example user. Alternately or in addition, the stock content manager module 220 is capable of programmatically modifying digital content components. In this way, a particular content component can be modified and served to different users with the visual characteristics desired by the different users. Returning again to the mobile phone example, the stock content manager module 220 can, for a single image of a mobile phone, generate a first layer that is combinable with the image to cause the mobile phone to be black and a second layer that is combinable with the image to cause the mobile phone to be pink. In this scenario, the first user is served the web page with the image having a black version of the mobile phone and the second user is served the web page with the same image except having a pink version of the mobile phone.

The visual characteristic data 318 can also be based on objects of the stock content or content added to (e.g., overlaid on) the stock content. For instance, the visual characteristic data 318 is usable to change a direction of a gaze of a person or other character depicted in an image or video, e.g., to cause the person to look at an object depicted in the image or video or look at text added to the image or video. The visual characteristic data 318 can also be useable to change portions of a vector graphic, e.g., lines, arcs, colors, and so forth. Further, the visual characteristic data 318 can be effective to remove portions of a stock content component, e.g., by applying a mask to cover portions of the component. The visual characteristic data 318 can therefore be used to specify a variety of attributes relating to visual characteristics of the digital content components without departing from the spirit or scope of the techniques described herein.

The learned characteristic data 320 represents attributes that are learned from a text query and/or sample components provided by a requestor. By way of example, the described techniques may involve a user (e.g., associated with the service provider system 202) submitting one or more sample components having the "look and feel" of the components desired. This user may provide such example components by selecting them via an interface associated with the stock service system 110, uploading the components, and so forth. In any case, the stock content manager module 220 is configured to learn attributes from sample components that are provided by a requestor. In particular, the stock content manager module 220 may use one or more machine learning techniques (e.g., trained neural networks) to learn desired attributes from the sample components.

The learned characteristic data 320 may thus be generated (e.g., by the stock content manager module 220) to describe the learned characteristics. Consider an example, in which a user selects three different images depicting a close-up of a person's face—though each face and the image backgrounds are significantly different between the three images—on the right side of the image. Given this, it may be learned that the user desires digital images that each depict a person's face, close-up, and on the right side of the image. It should be appreciated that a different machine learning techniques may be leveraged to learn attributes of sample content and that a variety of attributes of the sample content may be learned without departing from the spirit or scope of the techniques described herein.

Turning now to a discussion of the additional content data 310 in accordance with one or more implementations. The example additional content data 310 is depicted having branding data 322, font data 324, learned user demographic data 326, and restricted content data 328. The attribute data 304 may include additional content data 310 having different combinations of the discussed data and other data without departing from the spirit or scope of the described techniques.

The branding data 322 describes different aspects of a brand associated with an entity. By way of example, the branding data 322 may include one or more logos associated with the entity, color schemes used in connection with the entity's branding, moods of previous digital content used in connection with the brand, and so on. This branding data 322 may be used, at least in part, for selection and modification of digital content components from the maintained stock digital content 222. By way of example, the branding data 322 may be used to identify digital content components having a mood that matches moods of previous digital content components used in connection with the brand, as indicated by the branding data 322. The branding data 322 may be used to select digital content components with objects having colors that match color schemes used in connection with the branding or to modify digital content so that objects have colors that match the brand's color schemes. Further, the branding data 322 may be used to apply brand content to components, e.g., to add a logo associated with the entity to a digital content component or add a sound clip associated with the entity to a video. The branding data 322 may be used in a different ways to conform the provided digital content components to an entity's branding without departing from the spirit or scope of the techniques described herein.

The font data 324 describes one or more fonts that may be used for text of provided digital content components. By way of example, the font data 324 may describe a font type (e.g., serif, sans serif), a particular font (e.g., Times New Roman, Arial, Courier New, a brand-specific font), font size (e.g., in points, in relation to size of the digital content), font color, font characteristics (e.g., bold, italic, underline, shadow, strikethrough, all caps, small caps), character spacing, character width, paragraph alignment, and so forth. The font data 324 may simply be provided by an entity, e.g., to match the entity's brand. Alternately or in addition, the font data 324 may be learned. By way of example, it may be determined that a segment of users is more receptive to fonts having certain characteristics (e.g., a particular color and a size relative to the content) than other fonts. When the updating digital content 216 is delivered to a user of this segment, the stock content manager module 220 is capable of providing the digital content component 218 with text having the particular color and size to which the segment is more receptive.

Although not shown, the request 302 may also include text data in one or more implementations. Such text data indicates the text that is to be incorporated with a digital content component, e.g., overlaid on an image or portion of a video. The text data may be specified by a user or determined by machine learning techniques, e.g., based on user data of a user to which the updating digital content 216 is to be delivered. In one or more implementations, the text data may serve as a basis for audio data. In these scenarios, the stock content manager module 220 may generate audio data as a message for which the text is spoken, e.g., with a voice selected by the stock content manager module 220. The stock content manager module 220 may thus incorporate the generated spoken message with selected audio 230, such as background music. In any case, the font data 324 may describe a variety of characteristics to configure text for provided components without departing from the spirit or scope of the techniques described herein.

In one or more implementations, the attribute data 304 includes learned user demographic data 326. The learned user demographic data 326 corresponds to a user to which the updating digital content 216 is to be delivered. By way of example, a user of the client device 204 may navigate to a web page corresponding to the updating digital content 216, e.g., by typing in a web address or selecting a link. Responsive to receiving the input for navigating to the web page, the request 302 may be generated. In this scenario, the learned user demographic data 326 describes information learned about the user that navigated to the web page. The learned user demographic data 326 may be learned about the user in a variety of ways, such as through cookies, information contained in a user profile of the user, using machine learning to determine user demographics based on a manner in which the user interacts with the client device 204, determining information about the device (e.g., internet protocol (IP) address), leveraging a time the user makes the request, and so forth.

Additionally, the learned user demographic data 326 may describe a variety of characteristics of the user such as age, gender, location, interests, education level, income level, devices with which the user is associated, products the user has purchased and/or considered for purchase, services the user has purchased and/or considered for purchase, posts the user has posted to any of a variety of social networking services, and so on. The learned user demographic data 326 can be leveraged to determine content attributes that may be of interest to the user, such as objects and visual characteristics that are likely to draw the attention of the user. The learned user demographic data 326 may describe different characteristics of a single user or a group of users (e.g., a particular marketing segment) without departing from the spirit or scope of the described techniques.

In addition to the learned user demographic data 326, information learned about interaction with the updating digital content 216 or with a particular component can also be leveraged. For instance, demographics of users that have consumed the updating digital content 216 may be learned, such as that the users are more receptive to digital content that varies in certain ways. Based on this, suggestions can be made to a user (e.g., a marketer) that is responsible for requesting the stock content components for the updating digital content 216. One example of this is a suggestion to allow one or more attributes of the provided components to vary rather than to specify criteria for the one or more attributes. In addition or alternately, such suggestions may not be made. Instead, the stock content manager module 220 (or service manager module 212) may simply set some of the attributes to fixed or variable based on learned interactions.

In one or more implementations, the request 302 includes restricted content data 328. The restricted content data 328 describes restrictions to the components that can be provided. The restricted content data 328 can be leveraged to restrict the provided components from including certain objects, from including certain visual characteristics (e.g., colors, moods, styles), from including other content-type characteristics (e.g., sounds), and so on. Consider an example in which an entity requests images and indicates that the images are not to include people in swimwear. In this example, the restricted content data 328 can indicate that images including people in swimwear are not to be provided as the digital content component 218. The restricted content data 328 can also indicate depictions, video, or voices of certain people (e.g., certain celebrities) that are not to be included in the digital content component 218. This may be the case for an entity that endorses certain individuals and not others—the entity may not desire to be associated with individuals the entity does not endorse. Indeed, the restricted content data 328 can describe different restrictions without departing from the spirit or scope of the described techniques.

Additionally or alternatively, the request for digital content components 302 includes the subject data 312. As illustrated, the subject data 312 includes subject tag data 330, subject activity data 332, intent data 334, and subject demographics data 336. In general, the subject tag data 330 represents one or more tags for defining a subject of the digital content components that are to be provided. By way of example, the subject tag data 330 may be configured in the form of one or more text strings. These strings may be selectable or entered via a text field, e.g., in association with the request for digital content components 302. Examples of such strings include 'beach_scene,' 'nature,' and so forth. Consider an example in which the subject tag data 330 includes the tag 'nature'. In this scenario, digital images of an ocean vista and a mountain trail may be provided as the digital content component 218. In contrast, consider an example in which the subject tag data 330 does not include the tag 'nature,' but instead includes the tag 'beach'. In this scenario, digital images of an ocean vista may be provided as the digital content component 218 whereas digital images of a mountain trail may not be provided as the digital content component 218.

The subject activity data 332 describes an activity of a subject or subjects in the digital content components that are to be provided. By way of example, the subject activity data 332 is usable to specify that a subject of the provided content is to be talking on a phone, swimming, laughing with other subjects of the provided content, driving an automobile, and so forth. The subject activity data 332 may be used to describe the activities of various subjects without departing from the spirit or scope of the described techniques, such as activities of animals or inanimate subjects or interactions between multiple subjects.

The intent data 334 describes an intent that an entity has for incorporating the digital content component 218 into the updating digital content 216. In one or more implementations, there can be more than one intent associated with the request for digital content components 302. Additionally or alternately, these multiple intents can be prioritized such that there is a primary intent and one or more secondary intents. By way of example, the intent data 334 can indicate for the updating digital content 216 that a primary intent is to 'sell a maximum number of a product' and that a secondary intent is to 'increase brand awareness among one or more demographic segments'. Though specifying multiple intents is described, the intent data 334 may describe a single intent for incorporating the digital content component 218 into the updating digital content 216. The intent data 334 can be configured to include data indicative any number of intended purposes for the digital content components to be provided without departing from the spirit or scope of the described techniques.

The subject demographics data 336 is used to describe demographics of a subject included in the digital content components that are to be provided. By way of example, the subject demographics data 336 can specify demographic characteristics of the subject such as gender, age, race, style, and so forth. The subject demographics data 336 thus controls the demographic characteristics of subjects in the digital content components that are to be provided.

In addition to the object data 308, additional content data 310, and subject data 312, the attribute data 304 is also illustrated having artificial intelligence score data 338 ('AI score data 338'). In one or more implementations, the stock content manager module 220 or service provider system 202 leverages a machine learning algorithm configured to score content in terms of similarity to other content. This other content may be provided as an example or examples of the digital content component 218, be previously used as the digital content component 218, be identified for other updating digital content having similar intent data 334 (or other attribute data), and so forth. The machine-learning algorithm leveraged may be defined so as to enable the stock content manager module 220 or service provider system 202 to score content as being similar, even though such similarities may not be definable using standard limited attributes in Boolean fashion. This machine-learning algorithm also enables these systems to score content for similarity collectively across each attribute described by the attribute data 304. By using this score, the stock content manager module 220 or service provider system 202 can determine which of the maintained stock digital content 222 is "similar enough" (as defined by a threshold similarity score) to the other content considered. These systems can provide the content determined similar enough as an update of the digital content component 218.

In one or more implementations, the attribute data 304 is weighted. By "weighted" it is meant that each of the different types of data is associated with a weight. This weight reflects an importance of a corresponding attribute in relation to other attributes described by the data and for identifying the digital content components. By way of example, the visual subject activity data 332 may be more heavily weighted (e.g., given a larger weight) than the branding data 322. Based on this, the stock content manager module 220, when searching the maintained stock digital content 222, prioritizes identifying digital content components that match the attributes specified by the subject activity data 332 over digital content components that match the branding data 322. In another example, sample content may have been provided as an example of the digital content components the stock content manager module 220 is to provide. In this scenario, the sample content may be weighted more heavily than the other attributes specified by the user. This is because the stock content manager module 220 may be able to process the sample content to determine its characteristics and express its characteristics in a manner that is more easily understandable by computing devices (e.g., feature vectors) than attribute values specified by a user. The stock content manager module 220 can then use the determined characteristics of the sample content along with the weight to identify digital content components, e.g., from the maintained stock digital content 222.

In addition or alternately, the attribute data 304 may include information for specifying attributes that correspond to search queries rather than information specifying fixed attributes. By way of example, this search-query data is usable to specify a "latest" object in the digital content components provided. For instance, the search query data can be used to specify that the digital content components provided include a "latest" version of a particular mobile phone. This allows the stock content manager module 220 to distinguish between different digital content components, such as between an image depicting a latest version of the particular mobile phone and an image depicting a previous version of the particular mobile phone. The search-query data can be used to specify other variable attributes, such as "cheapest," "highest-rated," "most consumed," "most purchased," and so forth.

To enable the search-query data to be used, the stock service system 110 is configured to or accesses functionality to extend a definition of tags, such as the subject tag data 330 to handle search-query-based information such as "latest," "cheapest," "highest-rated," and so forth. The stock service system 110 may also include or access functionality for generating such tags and associating them with the corresponding digital content components. By way of example, the stock service system 110 may associate a "latest" tag with content when the request for digital content components is received 302, such that the digital content component served to a client device user includes an actual "latest" version of a specified subject at a time served. With respect to "latest" or other time-based tags, the stock service system 110 may filter the maintained stock digital content 222 with a filter for timestamps associated with content creation or timestamps associated with product creation. With respect to search-query data based on ratings (e.g., highest-rated), the stock service system 110 may reference a relevant rating system. By way of example, the stock service system 110 may reference a restaurant rating system (e.g., Yelp®) in connection with requests that relate to dining service content components. The stock service system 110 may reference a variety of rating systems depending on the content components served without departing from the spirit or scope of the techniques described herein.

The attribute data 304 may also serve as a basis for how digital content components are defined. Digital content components may be implemented, for instance, using a data structure that is based, at least in part, on the attribute data 304. Alternately or additionally, digital content components may include additional data (e.g., metadata) capable of describing a given component in terms of the attribute data 304. By way of example, a digital image may include metadata that describes a type of object included in the image (corresponding to the object type data 314), a location of each object in the image (corresponding to the object placement data 316), visual characteristics of the image and of each object in the image (corresponding to the visual characteristic data 318), and so forth. To the extent that the attribute data 304 may be configured in a variety of ways in addition to those discussed herein, so too may digital content definitions that are based on the attribute data 304.

Figure 4:
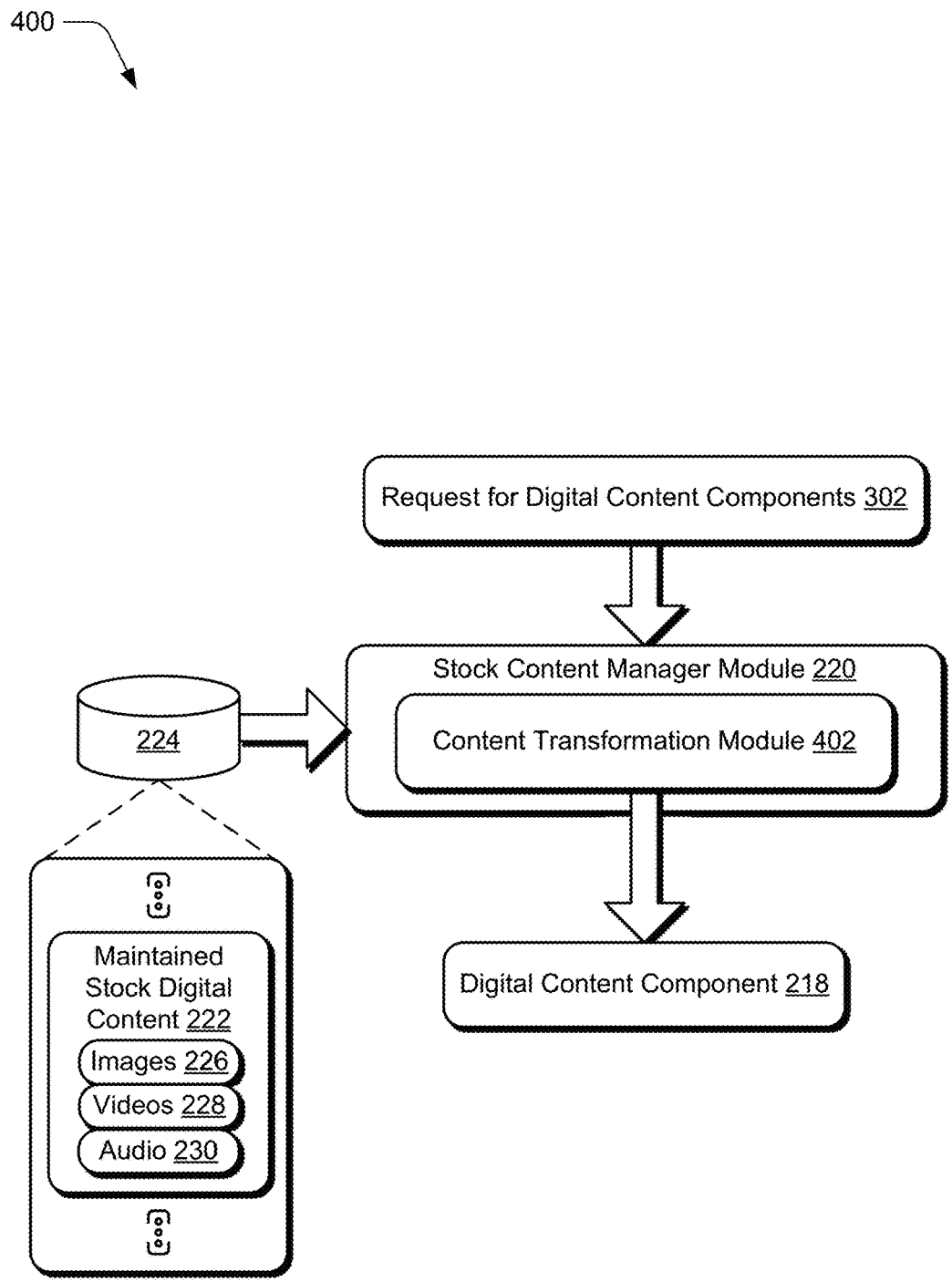
FIG. 4 depicts an example implementation in which a stock service system of FIG. 1 delivers stock digital content components having controlled attributes and for use to update digital content.

FIG. 4 depicts an example implementation 400 in which a stock service system 110 of FIG. 1 delivers stock digital content components having controlled attributes and for use to update digital content.

The illustrated example 400 includes from FIG. 2, the stock content manager module 220, the digital content component 218, and the maintained stock digital content 222, which is illustrated as stored in the storage 224 with the images 226, videos 228, and audio 230. Further, the example 400 includes from FIG. 3 the request for digital content components 302 ("request 302"). In this example 400, the stock content manager module 220 is depicted receiving the request 302. The request 302 may be received from the service provider system 202. Alternately or in addition, the request 302 may be received from the client device 204.

The stock content manager module 220 is illustrated having content transformation module 402, which represents functionality of the stock content manager module 220 to modify the maintained stock digital content 222. The content transformation module 402 is configured to perform a variety of operations to modify different types of content components, such as to modify the images 226, the videos 228, the audio 230, and/or other content types. For example, the content transformation module 402 is configured to perform various image modifying operations, such as cropping, zooming, applying filters, blurring, changing visual characteristics (e.g., colors of objects), adding text, adding logos, inserting objects extracted from other content (e.g., by extracting an object from one image and incorporating the extracted object into a different image), removing portions of content components, and so on. To carry out these operations, the content transformation module 402 may utilize content layering as described in relation to FIG. 5.

The content transformation module 402 also represents functionality to perform a variety of video and audio modifying operations. Regarding video modification, for instance, the content transformation module 402 may be configured to clip digital video (e.g., to remove certain scenes), add together digital video clips from different stock videos 228, change a speed of video (e.g., slow down or speed up), and so on. The content transformation module 402 may also be configured to perform a variety of the above-described image operations on the video such as to crop the video frames, zoom portions of the video, add text, add graphics (e.g., logos), and so forth. The content transformation module 402 may carry out at least some of these video modifying operations (e.g., adding text, logos, and audio) by adding content layers to the video. Regarding audio modification, the content transformation module 402 may be configured to clip digital audio, increase an intensity (e.g., make louder) of portions of audio, decrease the intensity of portions of audio, change speeds of audio, add together digital audio clips from different stock audio 230, add a spoken voice message generated based on the request 302 to the audio, and so forth. Accordingly, the content transformation module 402 may be configured to modify content components in a variety of ways without departing from the spirit or scope of the techniques. In the context of modifying digital content components using content layers, consider FIG. 5.

Figure 5:
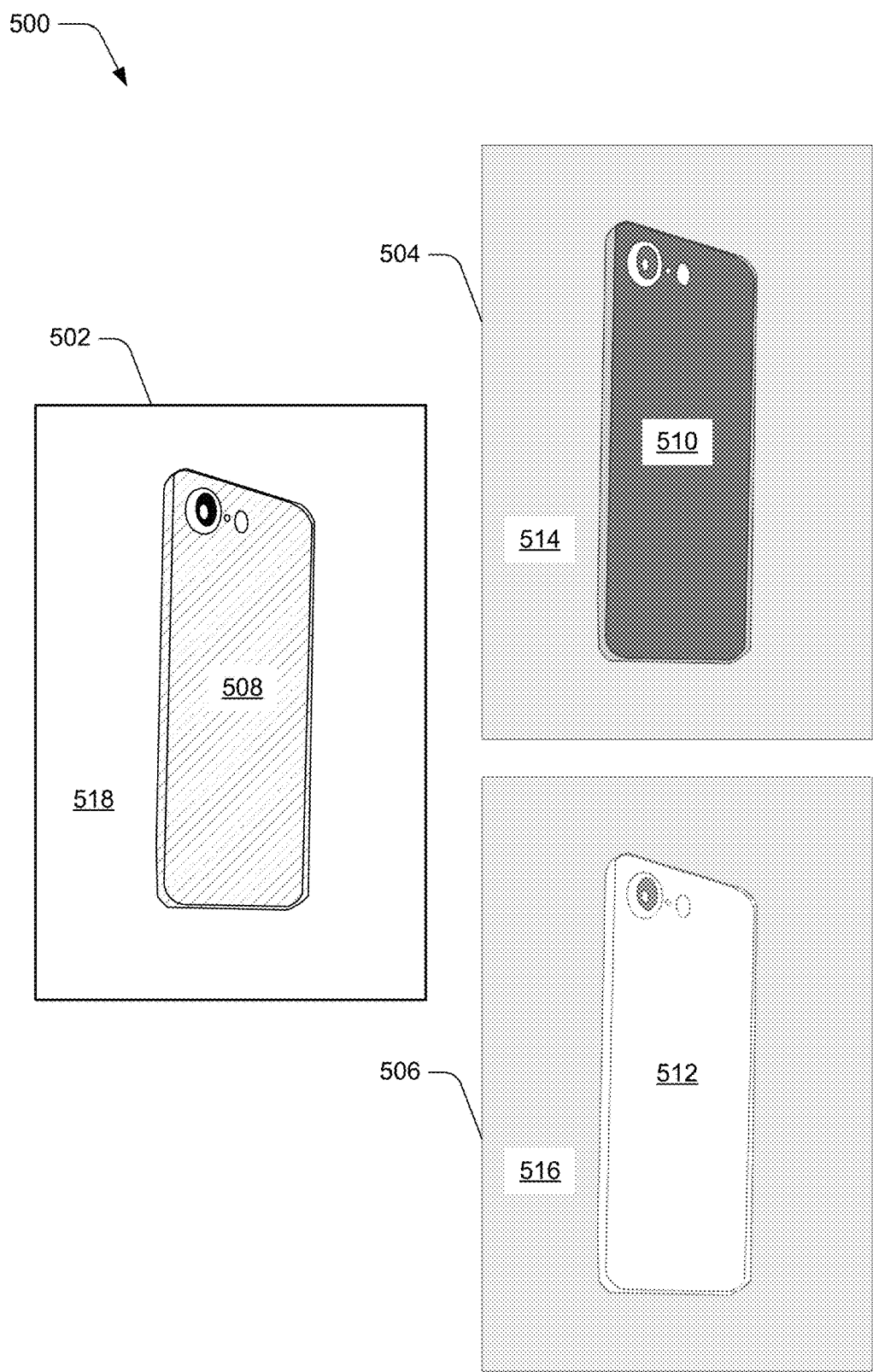
FIG. 5 depicts an example of digital content layers to modify an attribute of a stock digital content component.

FIG. 5 depicts an example 500 of digital content layers to modify an attribute of a stock digital content component. The illustrated example 500 includes digital image 502, first layer 504, and second layer 506.

The first and second layers 504, 506 represent example digital content configured as layers that the content transformation module 402 is capable of generating to modify the digital image 502. The digital image 502 is illustrated depicting a mobile phone 508. Further, the first and second layers 504, 506 are illustrated having mobile phone overlays 510, 512, respectively. In the illustrated example 500, the mobile phone 508 is depicted having a first color (e.g., gray by way of the hatching), the mobile phone overlay 510 is depicting having a second color (black), and the mobile phone overlay 512 is depicted having a third color (white). In one or more implementations, the remaining portions 514, 516, respectively, of the first and second layers 504, 506 are transparent. In this way, the first layer 504 may be overlaid on the digital image 502 to modify the digital image 502 so that the mobile phone 508 has the second color. Similarly, the second layer 506 may be overlaid on the digital image 502 to modify the digital image 502 so that the mobile phone 508 has the third color. Since the remaining portions 514, 516 of the first and second layers 504, 506 are transparent, the non-phone portions 518 of the digital image 502 are not also transformed—these portions appear the same as in the unmodified version of the digital image 502.

In the context of the illustrated example 500, the content transformation module 402 is configured to generate different layers for modifying the mobile phone 508's color to any of a variety of colors. As discussed above, the content transformation module 402 may modify the mobile phone 508's color based on a user to which the updating digital content 216 is being served, e.g., based on the learned user demographic data 326. Clearly, the content transformation module 402 is also capable of generating a text layer having text configured according to the font data 324, such that the text layer can also be overlaid on the digital image 502 to modify the digital image 502 so that it includes text. FIG. 5 represents one example of layers that the content transformation module 402 is configured to generate and that can be used to modify stock digital content components. Accordingly, the content transformation module 402 is configured to generate different types of layers to change attributes of different types of digital content components.

An advantage of this layering approach is that it can be implemented in a manner that is "non-destructive" to a digital content component. By "non-destructive" it is meant that, regardless of the modifications made, the techniques enable the content transformation module 402 to revert to a pre-modification version of a digital content component, e.g., by removing layers applied. To this extent, the content transformation module 402 is also configured to selectively remove one or more, but not all, layers applied to a digital content component. By way of example, the content transformation module 402 may remove an object color-changing layer that is applied to an image to change an object's color, but not remove a text layer applied to the image. As a result, the object's color may revert to an original color of the image, but the applied text remains. Broadly speaking, these operations may be carried out by modifying a file corresponding to a digital content component, e.g., a file capable of accessing the digital content component as well as generated layers and from which various digital content components can be generated based on application or removal of different digital content layers. The content transformation module 402 may also modify digital content in ways other than using a layering approach without departing from the spirit or scope of the described techniques.

Having discussed example details of the techniques for an update basis for updating digital content in a digital medium environment, consider now some example procedures to illustrate additional aspects of the techniques.

Example Procedures

This section describes example procedures of an update basis for updating digital content in a digital medium environment in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures are performed by a suitably configured device, such as the stock service system 110 of FIG. 1, the service provider system 202 of FIG. 2, or the client device 204 that makes use of the communication module 214.

Figure 6:
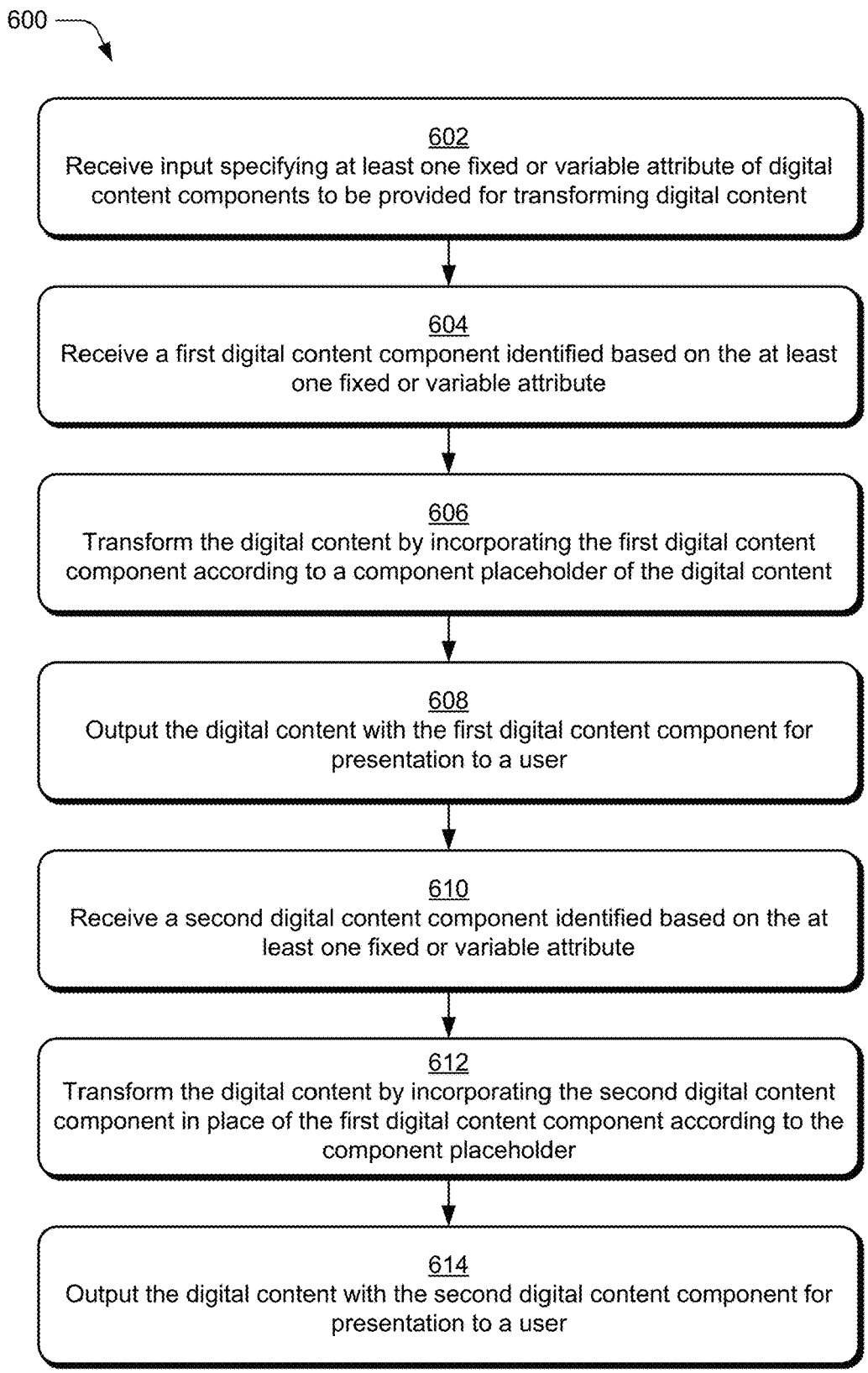
FIG. 6 depicts a procedure in an example implementation in which digital content is transformed by incorporating different digital content components that are provided by a service system based on attributes to control the different digital content components provided.

FIG. 6 depicts an example procedure 600 in which digital content is transformed by incorporating different digital content components that are provided by a service based on attributes to control the different digital content components provided.

Input is received that specifies at least one fixed or variable attribute of digital content components that are to be provided for updating digital content (block 602). By way of example, user input is received that specifies at least one fixed or variable attribute that content components provided by the stock service system 110 are to exhibit. Broadly speaking, these content components are provided by the stock service system 110 for transforming the updating digital content 216, e.g., so that the digital content component 218 at a minimum may keep the updating digital content 216 from becoming stale and at a maximum may include attributes that are customized to a user consuming the updating digital content 216. Based on this input, the request for digital content components 302 ("request 302") may be generated, e.g., by the service provider system 202. Further, the request 302 may be communicated over the network 210 to the stock service system 110 to enable the stock service system 110 to provide content components for the updating digital content 216.

A first digital content component is received based on the at least one fixed or variable attribute (block 604). By way of example, the service provider system 202 receives a first digital content component 218 from the stock service system 110. In one or more implementations, the stock content manager module 220 identifies this first digital content component from the maintained stock digital content 222 based on attributes described by the request 302, e.g., the attribute data 304.

The digital content is transformed by incorporating the first digital content component (block 606). In accordance with the principles discussed herein, the first digital content component is incorporated according to a component placeholder of the digital content. By way of example, the service provider system 202 transforms the updating digital content 216 by incorporating the first digital content component received at block 604. In particular, the service provider system 202 incorporates the first digital content component according to the component placeholder 232. As discussed above, this transformation alternately or additionally may be performed by the client device 204 and/or the stock service system 110.

The digital content with the first digital content component is output for presentation to a user (block 608). By way of example, the client device 204 outputs the updating digital content 216 with the first digital content component 218 for presentation to a user. For instance, the client device 204 displays the updating digital content 216 with the first digital content component 218 (or portions thereof) via a display device, outputs the updating digital content 216 with the first digital content component 218 (or portions thereof) via one or more speakers, and so forth.

A second digital content component is received based on the at least one fixed or variable attribute (block 610). By way of example, the service provider system 202 receives a second digital content component 218 from the stock service system 110, and the second digital content component 218 is different from the first digital content component received at block 604. In one or more implementations, the stock content manager module 220 identifies this second digital content component from the maintained stock digital content 222 based on the attributes described by the request 302. The second digital content component is also received based on the timing data 306, e.g., according to a subscription, based on a determination that the current component of the updating digital content 216 is stale, as a user-selectable suggestion (e.g., via email) at the service provider system 202, and so forth.

The digital content is transformed by incorporating the second digital content component (block 612). In accordance with the principles discussed herein, the second digital content component is incorporated in place of the first digital content component according to the component placeholder. By way of example, the service provider system 202 transforms the updating digital content 216 by incorporating the second digital content component received at block 610 according to the component placeholder 232. As incorporated, the second digital content component received at block 610 replaces the first digital content component incorporated at block 606.

The digital content with the second digital content component is output for presentation to a user (block 614). By way of example, the client device 204 outputs the updating digital content 216 with the second digital content component for presentation to a user, e.g., the updating digital content 216 is displayed, output audibly, and so forth.

FIG. 7 depicts an example procedure 700 in which different digital content components are delivered for incorporation with digital content.

A first digital content component is identified from a content repository for updating digital content (block 702). In accordance with the principles discussed herein, the first digital content component is identified based on data specifying at least one fixed or variable attribute that provided digital content components are to exhibit. By way of example, the stock content manager module 220 identifies a first digital content component 218 that is to be incorporated with the updating digital content 216. The stock content manager module 220 identifies this first digital content component based on the request 302, which corresponds to the updating digital content 216. Further, the request 302 includes data (e.g., the attribute data 304) that specifies fixed and variable attributes that the digital content component 218 is to exhibit. In one or more implementations, the stock content manager module 220 identifies the first digital content component from the maintained stock digital content 222.

The first digital content component is optionally modified based on the data specifying the at least one fixed or variable attribute (block 704). By way of example, the content transformation module 402 modifies the first digital content component based on the request 302. The content transformation module 402 modifies the first digital content component when the component, as identified from the maintained digital stock content 222, does not match each of the attributes specified via the request 302, and when the identified component can be changed to match the specified attributes. As one example of a modification consider FIG. 5, which depicts the digital image 502 and the first layer 504. Assume in this example, that the digital image 502 corresponds to the first digital content component identified at block 702 and that the attributes of the digital image 502 do not match each of the attributes specified by the request 302. Assume also that the digital image 502 can be changed so that its attributes do match those specified by the request 302, e.g., by changing a color of the mobile phone 508 from the first color to the second color of the phone overlay 510. In this case, the content transformation module 402 generates the first layer 504 and applies the first layer 510 to the digital image 502. This is effective to modify the digital image 502 so that the mobile phone 508 has the second color, e.g., black instead of gray.

The first digital content component is delivered for incorporation with the digital content (block 706). In accordance with the principles discussed herein, when the first digital content component is modified at block 704, the delivered first digital content component includes at least one modification. By way of example, the stock content manager module 220 delivers the first digital content component 218 for incorporation with the updating digital content 216. When the first digital content component is modified at block 704, the digital content component includes corresponding modifications.

A second digital content component is identified from the content repository for the digital content (block 708). In accordance with the principles discussed herein, the second digital content component is identified based on the data specifying at least one fixed or variable attribute. By way of example, the stock content manager module 220 identifies a second digital content component 218 that is to be incorporated with the updating digital content 216. The stock content manager module 220 identifies this second digital content component based on the request 302 and from the maintained stock digital content 222. Identification of the second digital content component is based on the timing data 306, e.g., according to a subscription, based on a determination that the current component of the updating digital content 216 is stale, as a user selectable suggestion (e.g., via email) for the service provider system 202, and so forth.

The second digital content component is optionally modified based on the data specifying the at least one fixed or variable attribute (block 710). By way of example, the content transformation module 402 modifies the second digital content component based on the request 302. In scenarios in which the identified digital content component does match the attributes specified via the request, the identified digital content may not be modified before being delivered.

The second digital content component is delivered for incorporation with the digital content (block 712). In accordance with the principles discussed herein, when the second digital content component is modified, the delivered second digital content component includes at least one modification. By way of example, the stock content manager module 220 delivers the second digital content component 218 for incorporation with the updating digital content 216. When the second digital content component is modified at block 710, the delivered digital content component includes corresponding modifications.

Having described example procedures in accordance with one or more implementations, consider now an example system and device that can be utilized to implement the various techniques described herein.

Example System and Device

Figure 8:
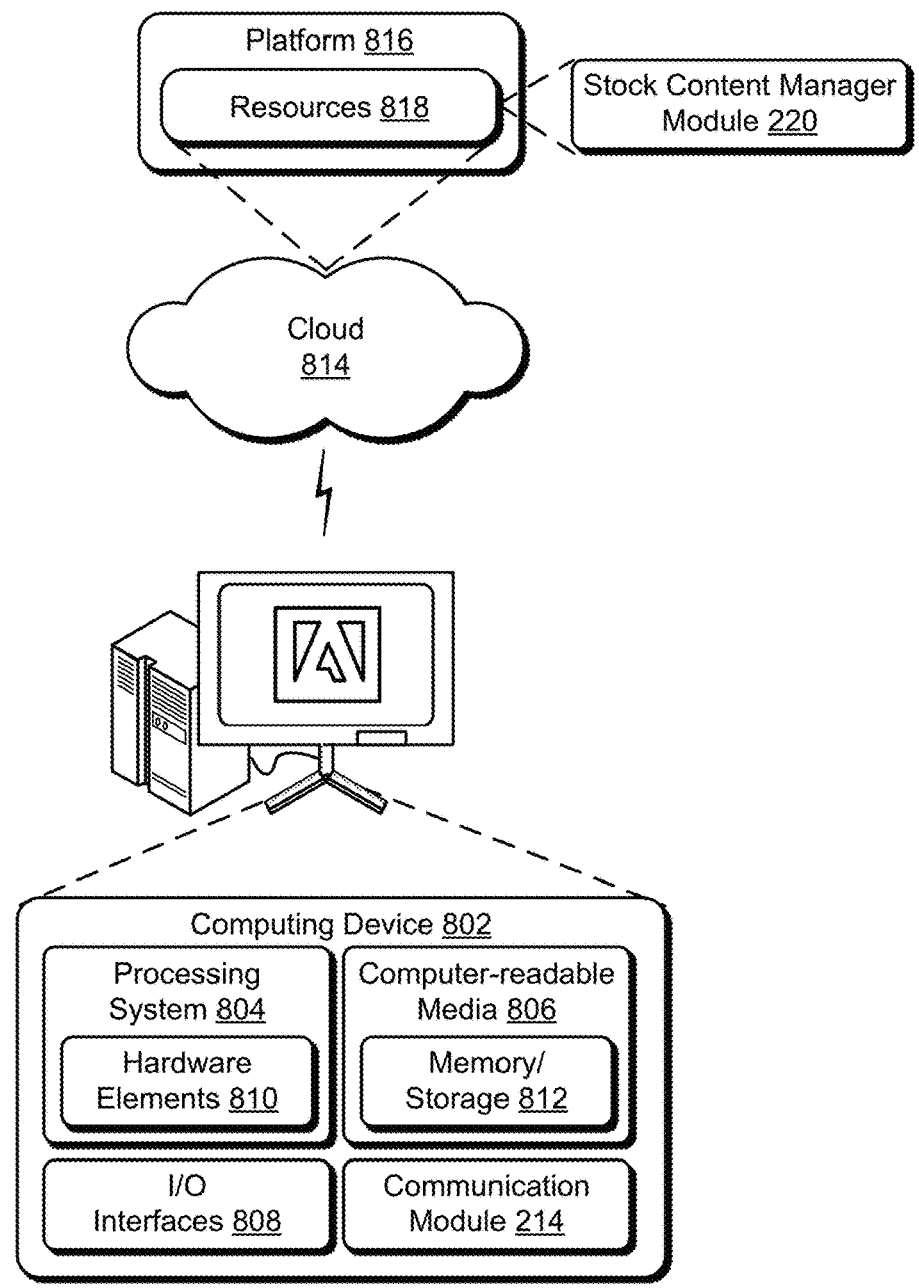
FIG. 8 illustrates an example system including various components of an example device that can be implemented as any type of computing device as described and/or utilized with reference to FIGS. 1-7 to implement embodiments of the techniques described herein.

FIG. 8 illustrates an example system generally at 800 that includes an example computing device 802 that is representative of one or more computing systems and/or devices that may implement the various techniques described herein. This is illustrated through inclusion of the communication module 214 and the stock content manager module 220. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to reduce a perceived staleness of digital content components included in digital content, a method implemented by at least one computing device associated with a service, the method comprising:
   receiving, by the at least one computing device, data corresponding to a component request for digital content components, the data describing a timing basis at which the service updates the digital content by providing the digital content components and the data further describing at least one attribute of the digital content components, the timing basis being consumption based such that the digital content components are provided as updates based on component exposure to users;
   identifying, by the at least one computing device, a first digital content component from a digital content repository based on the at least one attribute;
   providing, by the at least one computing device, the first digital content component as an update to the digital content according to the timing basis;
   identifying, by the at least one computing device, a second digital content component from the digital content repository based on the at least one attribute; and
   providing, by the at least one computing device, the second digital content component as an additional update to the digital content according to the timing basis to replace the first digital content component, the second digital content component provided as the additional update responsive to the first digital content component having been exposed at least once to a user associated with a request for the digital content.

2. A method as described in claim 1, wherein the request corresponds to a subscription for the digital content components.

3. A method as described in claim 1, further comprising receiving additional data corresponding to an additional component request for the digital content components, the additional data describing a different timing basis at which the service updates additional digital content by providing the digital content components as updates to the additional digital content, the different timing basis comprising at least one of:
   a seasonal basis that specifies to provide the digital content components as the updates to the additional digital content based on changing seasons;
   a time of day basis that specifies to provide the digital content components as the updates to the additional digital content based on the time of day changing; or
   a different time interval basis that specifies to provide the digital content components as the updates to the additional digital content based on an interval of time lapsing.

4. A method as described in claim 1, wherein the timing basis is further consumption based such that the digital content components are provided as the updates based on the component exposure to users and based on receiving user input in relation to the digital content.

5. A method as described in claim 4, wherein the digital content is a web page and the user input is a navigation input to navigate to the web page received from the user associated with the request for the digital content.

6. A method as described in claim 4, wherein the at least one attribute is based on information describing the user.

7. A method as described in claim 6, further comprising:
   modifying identified digital content components based on the information describing the user; and
   providing the modified digital content components as updates to the digital content.

8. A method as described in claim 1, further comprising determining that the first digital content component has been exposed at least once to the user associated with the request for the digital content.

9. A method as described in claim 1, wherein the data of the component request further describes an update type, the described update type indicating to provide the digital content components as identified from the digital content repository.

10. A method as described in claim 9, wherein the first and second digital content components are provided as identified from the digital content repository without being modified according to the update type.

11. A method as described in claim 1, wherein the data of the component request further describes an update type, the described update type indicating to modify the digital content components identified from the digital content repository before providing the digital content components as the updates.

12. A method as described in claim 1, wherein the digital content repository comprises stock digital content.

13. A method as described in claim 1, wherein the at least one computing device is a server device associated with the service.

14. A method as described in claim 1, further comprising:
   receiving the digital content; and
   transforming the digital content by incorporating at least one of the first or second digital content components into a component placeholder of the digital content.

15. A system comprising:
   at least one processor; and
   memory having stored thereon computer-readable instructions that are executable by the at least one processor to perform operations for implementing a service to reduce a perceived staleness of digital content components included in digital content, the operations comprising:
      maintaining a repository of stock digital content components;
      identifying a stock digital content component from the repository based on a subscription associated with the digital content, the subscription having a timing basis at which the service updates the digital content by providing identified stock digital content components, the timing basis being consumption based such that the identified stock digital content components are provided as updates based on component exposure to users; and
      providing the stock digital content component as an update to the digital content according to the timing basis of the subscription to replace a different stock digital content component, the stock digital content component provided as the update responsive to the different stock digital content component having been exposed at least once to a user associated with a request for the digital content.

16. A system as described in claim 15, wherein the operations further comprise:

exposing digital content comprising a plurality of suggested stock digital content components to a user associated with an additional subscription, each of the suggested stock digital content components being user selectable as an update to additional digital content; and responsive to receiving a user selection of one of the suggested stock digital content components, providing the selected content component as an update to the additional digital content.

17. A system as described in claim 16, wherein the exposing is performed according to an additional timing basis of the additional subscription.

18. A system as described in claim 15, wherein the operations further comprise modifying the stock digital content component before providing the stock digital content component as the update.

19. In a digital medium environment to reduce a perceived staleness of digital content components included in digital content, a method implemented by at least one computing device, the method comprising:

displaying, by the at least one computing device, an interface, the interface enabling management of a subscription to receive digital content components from a content repository service system;

receiving, by the at least one computing device, input via the interface to specify a timing basis at which the content repository service system is to provide the digital content components for incorporation into the digital content to replace previously incorporated digital content components, the timing basis being consumption based such that a digital content component is provided as an update for incorporation into the digital content to replace a previously incorporated digital content component responsive to the previously incorporated digital content component having been exposed at least once to a user associated with a request for the digital content; and generating, by the at least one computing device, a subscription request for communication to the content repository service system based, in part, on the specified timing basis.

20. A method as described in claim 19, further comprising:

receiving an additional input to specify a content attribute to control the digital content components provided by the content repository service system; and generating the subscription request based further on the specified content attribute.

* * * * *